(No Model.)
C. S. ROGERS.
SPRING CALIPERS.
No. 343,342. Patented June 8, 1886.
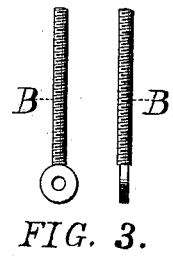
FIG. 3.
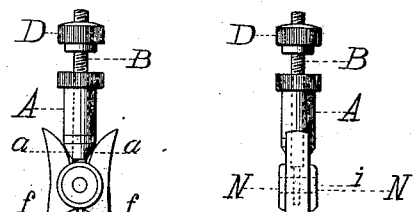
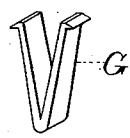
FIG. 5.
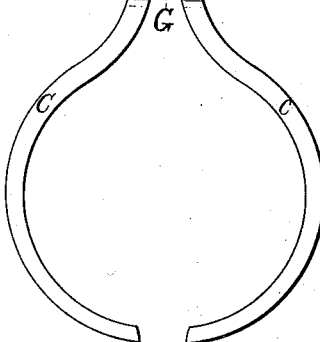
FIG. 1.   FIG. 2.
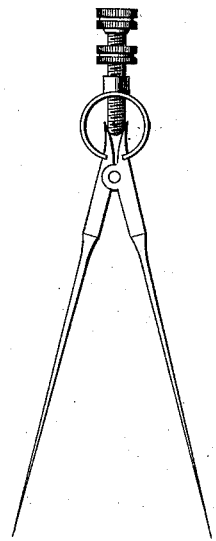
FIG. 6.
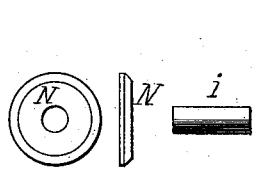
FIG. 8.
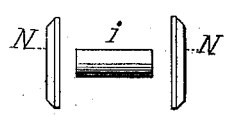
FIG. 7.
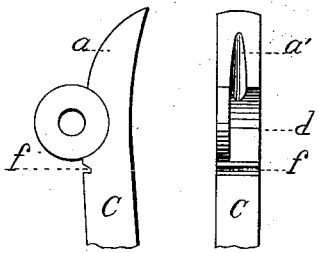
FIG. 4.
WITNESSES:
J. C. Curley
E. H. Waite
INVENTOR
Cyrus S. Rogers
BY
Edwin S. Field
ATTORNEY
N. PETERS, Photo-Lithographer, Washington, D. C.

UNITED STATES PATENT OFFICE.

CYRUS S. ROGERS, OF SPRINGFIELD, MASSACHUSETTS, ASSIGNOR OF ONE-HALF TO CHRIS. BERRY, OF SAME PLACE.

SPRING-CALIPERS.

SPECIFICATION forming part of Letters Patent No. 343,342, dated June 8, 1886.

Application filed March 15, 1886. Serial No. 195,287. (No model.)

*To all whom it may concern:*

Be it known that I, CYRUS S. ROGERS, a citizen of the United States, residing at Springfield, in the county of Hampden and State of Massachusetts, have invented a new and useful Improvement in Spring Calipers and Dividers and like Articles, of which the following is a specification.

My invention relates to spring-calipers having the adjusting device above the joint; and the object of my invention is to make a more compact and reliable caliper. I attain these objects by the mechanism illustrated in the accompanying drawings, in which—

Figure 1 is a side view of the caliper complete. Fig. 2 is an edge view of the same; Fig. 3, side and edge views of the screw, flattened at one end, with a hole in it; Fig. 4, enlarged views of the upper part of a leg, showing the joint and incline; Fig. 5, the V-shaped spring. Figs. 7 and 8 are enlarged views of the pin and two washers that rivet the legs together. Fig. 6 represents a manner in which the caliper might be made.

Similar letters refer to similar parts throughout the several views.

The legs C C are countersunk at the joint two-thirds the depth of their thickness, as shown at $d$ in Fig. 4. This allows the legs to fit into each other with a space between for the flat end or eye of the screw B. The pin $i$ passes through the holes in the legs, and through the eye of the screw between them, and projects outside far enough for the reception of the washers N N, which are held in place by riveting the pin $i$. The legs C C are made with a circular incline, $a\ a$, at their upper ends, above the joint, the inclines being grooved, as shown at $a'$ in Fig. 4.

The calipers are adjusted when in use by raising or lowering the nut A on the screw B, the point of the nut pressing against the inclines $a\ a$, while the spring G presses the legs apart below the joint, thereby taking up all lost motion and forcing the inclines $a\ a$ continuously against the point of the nut. A washer may be used at the point of the nut, if desired.

The check-nut D is to fasten the calipers at any desired point of measurement so they can be handled and used without altering.

The spring G is detachable, and is put in place after the legs are riveted together, the ends of the spring fitting into the notches $f\ f$, below the joint.

The dividers, Fig. 6, is another method of using a spring by having a bow above the joint.

I claim as my improvement—

1. In calipers and dividers, the combination of the legs C C, countersunk at the joint for the reception of each other, with a space between for the eye of the screw B, and provided with inclines $a\ a$ on their inner edges, above the joint, with the screw B, flattened at one end, nut A, check-nut D, and spring G, substantially as described.

2. In calipers and dividers, the combination of the screw B, flattened at one end, with the legs C C, jointed together and provided with inclines $a\ a$, nut A, check-nut D, and spring G, substantially as shown.

3. In calipers and dividers, the combination of the nut A, provided at the lower end with a suitable surface to press against the inclines $a\ a$ on legs C C, with the screw B, check-nut D, legs C C, and spring G, substantially as shown.

4. In calipers and dividers, the combination of the detachable spring G with the ends bent outward to press into the notches $f\ f$ in legs C C, with the legs C C, jointed together and provided with inclines $a\ a$, screw B, flattened at one end, nut A, and check-nut D, substantially as shown.

CYRUS S. ROGERS.

Witnesses:
    E. P. BARTHOLOMEW,
    CHRIS. BERRY.